US008151520B2

(12) United States Patent
Yamashita et al.

(10) Patent No.: US 8,151,520 B2
(45) Date of Patent: Apr. 10, 2012

(54) VEHICLE SASH DOOR AND PROTECTOR AND CENTER CHANNEL FOR THE SAME

(75) Inventors: Chikara Yamashita, Ibara (JP); Akihiro Terai, Ibara (JP); Hiromichi Torihata, Ibara (JP); Tsuyoshi Fujiwara, Ibara (JP)

(73) Assignee: Katayama Kogyo Co., Ltd. (JP)

( * ) Notice: Subject to any disclaimer, the term of this patent is extended or adjusted under 35 U.S.C. 154(b) by 607 days.

(21) Appl. No.: 12/330,801

(22) Filed: Dec. 9, 2008

(65) Prior Publication Data

US 2009/0145043 A1    Jun. 11, 2009

(30) Foreign Application Priority Data

Dec. 10, 2007   (JP) ................................. 2007-317866

(51) Int. Cl.
*B60J 5/04* (2006.01)
(52) U.S. Cl. ...................... 49/502; 296/146.2; 296/146.5
(58) Field of Classification Search .................... 49/502; 296/146.2, 146.5
See application file for complete search history.

(56) References Cited

U.S. PATENT DOCUMENTS

| 4,348,046 | A | * | 9/1982 | Ohya ............................ 296/201 |
| 4,567,636 | A | * | 2/1986 | Draper et al. ................ 29/401.1 |
| 5,404,677 | A | * | 4/1995 | Umeda ............................ 49/502 |
| 5,557,890 | A | * | 9/1996 | Levy et al. ....................... 49/502 |
| 6,422,639 | B1 | * | 7/2002 | Hemauer .................... 296/146.5 |
| 6,425,209 | B1 | * | 7/2002 | Park ................................ 49/502 |
| 6,886,881 | B1 | * | 5/2005 | Henderson et al. ......... 296/146.2 |
| 7,210,730 | B2 | * | 5/2007 | Fujita et al. ................. 296/146.5 |
| 2001/0002520 | A1 | * | 6/2001 | Lim .............................. 49/493.1 |
| 2006/0290168 | A1 | * | 12/2006 | Morikawa et al. ........ 296/146.16 |
| 2008/0252097 | A1 | * | 10/2008 | Miyamoto et al. ......... 296/146.2 |

FOREIGN PATENT DOCUMENTS

| JP | 61-218423 | | 9/1986 |
| JP | 2006-232137 | | 9/2006 |
| JP | 2006256546 | A * | 9/2006 |
| JP | 2007-1547 | | 1/2007 |

* cited by examiner

*Primary Examiner* — Darnell Jayne
*Assistant Examiner* — Marcus Menezes
(74) *Attorney, Agent, or Firm* — Gerald E. Hespos; Michael J. Porco

(57) ABSTRACT

A center-channel protector for a vehicle sash door is arranged between a main sash and a center channel. A body of the protector has an H-shaped upper-end surface which is compatible to cover the upper end of the center channel. The body integrally includes a pair of branch covering portions corresponding to a pair of branch portions constituting the center channel and a middle covering portion disposed between the branch covering portions so as to connect the both branch covering portions therewith. An engaging portion is provided with the body and is mechanically engaged, in a direction intersecting a vertical direction, with an engaged portion which is provided with a center channel side. In collaboration with the engaged portion, the engaging portion constitutes a fastening mechanism by which the protector is fastened on the center channel.

10 Claims, 6 Drawing Sheets

VEHICLE SASH DOOR AND PROTECTOR AND CENTER CHANNEL FOR THE SAME

BACKGROUND OF THE INVENTION

1. Field of the Invention

The present invention relates to a vehicle sash door and a protector and a center channel for the sash door, particularly a vehicle sash door including a center channel which guides ascents and descents of a window glass and a protector attached to the center channel or the like.

2. Description of the Related Art

A vehicle sash door includes a main sash, and a center channel partitioning window frames together with the main sash and guiding a window glass arranged in a partition of the window frames in such a way that the window glass is vertically movable. An upper end of the center channel is jointed to a lateral sash part of the main sash or main channel to thereby form a T-shape.

There is provided a special coupling member between the center channel and the lateral sash part, for example, as described in Japanese Patent Laid-Open Publication No. 61-218423. The coupling member includes a protector for the upper end of the center channel. The protector is formed by a special sealing member. Adhesion parts of the protector are sticked by adhesion means such as specified glue or a double-coated adhesive tape.

SUMMARY OF THE INVENTION

It is an object of the present invention to provide a vehicle sash door capable of omitting the above adhesion means, being easily assembled and finely finished.

One aspect of the present invention is a center-channel protector for a vehicle sash door which is arranged between a main sash and a center channel having an H-shaped upper-end surface so as to cover the upper end of the center channel. A body of the protector forms an H-shaped bottom surface which is compatible to cover the upper-end surface of the center channel. The body integrally includes a pair of branch covering portions corresponding to a pair of branch portions constituting the center channel, a middle covering portion disposed between the branch covering portions so as to connect the both branch covering portions therewith, and an engaging portion engages with an engaged portion which is provided with a center channel side in a direction intersecting a vertical direction. The engaging portion constitutes a fastening mechanism by which the protector is mechanically fastened to the center channel in collaboration with the engaged portion.

According to the present invention, the protector of which body has the H-shaped plane is attached to the center channel so that the upper end of the center channel is covered therewith, thereby protecting the upper end of the center channel. Additionally, the fastening mechanism mechanically fastens the attached protector onto the center channel. Without any adhesion means, a vehicle sash door in which the protector protects the center channel can sustain a firm fastening conditions over a relatively long period of time. Therefore, even if the vehicle sash door is in a semi-fabricated product, transportations of such the product would be conducted without any damage of the upper-end part of the center channel, provided that the product has the protector. In addition, although the present invention does not preclude the use of adhesion means, such an omission would be preferable because it makes free from disadvantages, such as an adhesive stains of peripheral members caused by leaking out or the like, an adhesive deteriorates which would cause the protector to be fallen off or detached.

In contrast, the indispensable use of the adhesion means in the prior art as described above, could lead disadvantages such as disconnection of the protector due to the delamination of adhesive parts which would occur in certain instances of adhesive conditions or the deteriorations with time. Furthermore, the glue could be forced and leaked out, thereby spoiling the exterior appearance or causing such another.

These and other objects, features and advantages of the present invention will become more apparent upon reading of the following detailed description along with the accompanied drawings.

DETAILED DESCRIPTION OF THE PREFERRED EMBODIMENTS

Figure 1:
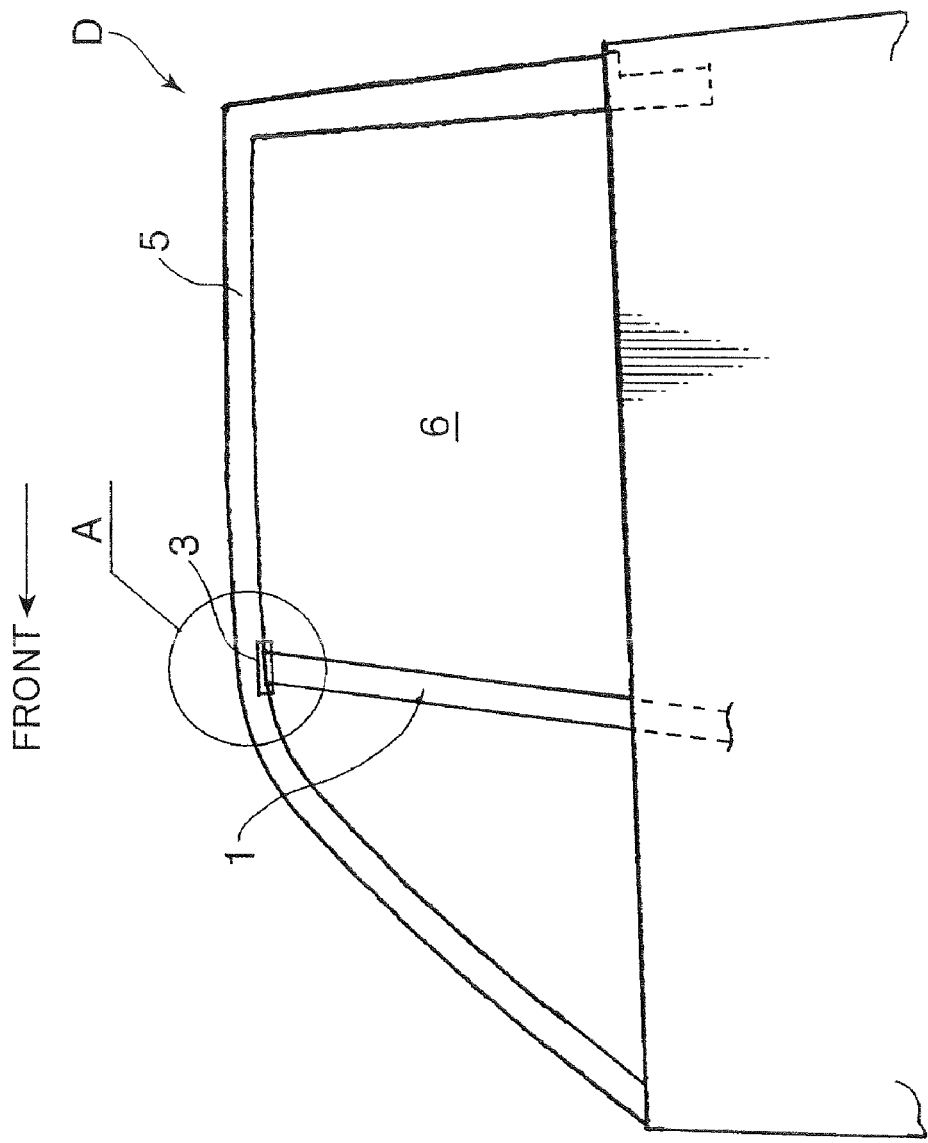
FIG. 1 is a schematic view showing the whole configuration of a vehicle sash door according to the present invention.

With reference to FIG. 1, a vehicle sash door D according to an embodiment of the present invention includes a center channel 1 and a main channel or a main sash 5 which partitions a window frame together with the center channel 1. The center channel 1 guides a window glass 6 arranged in one partition of the window frame in such a way that the window glass 6 ascends and descends in vertical direction.

In this example, the center channel 1 lies midway in the front and rear directions of the vehicle sash door D and extends almost vertically. The upper end of the center channel 1 is jointed at the middle (lateral sash part) of a main sash 5 in the longitudinal directions. This junction (designated by A of FIG. 1) is provided with a protector 3 for securing an exterior design, for a function of holding the window glass 6, or the like. This embodiment is notable in that a way attaching the protector 3 without any adhesion means such as glue. Omission of such an adhesive as glue would be preferable because it makes free from disadvantages, such as an adhesive stains of peripheral members caused by leaking out or the like, an adhesive deteriorates which would cause the protector to be fallen off or detached.

Figure 2:
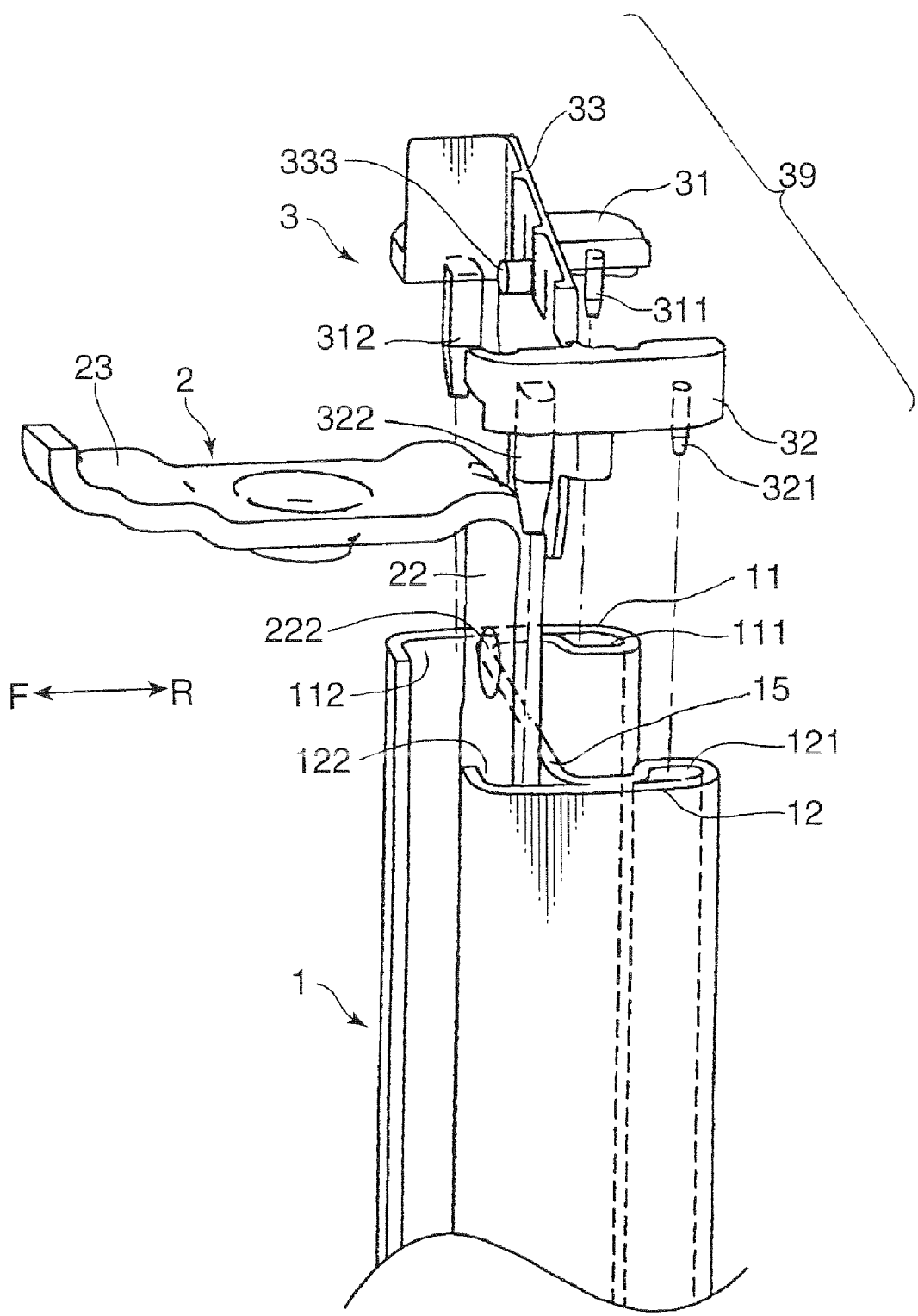
FIG. 2 is a perspective exploded view showing a configuration around a protector attachment part according to a first embodiment of the present invention.
Figure 3:
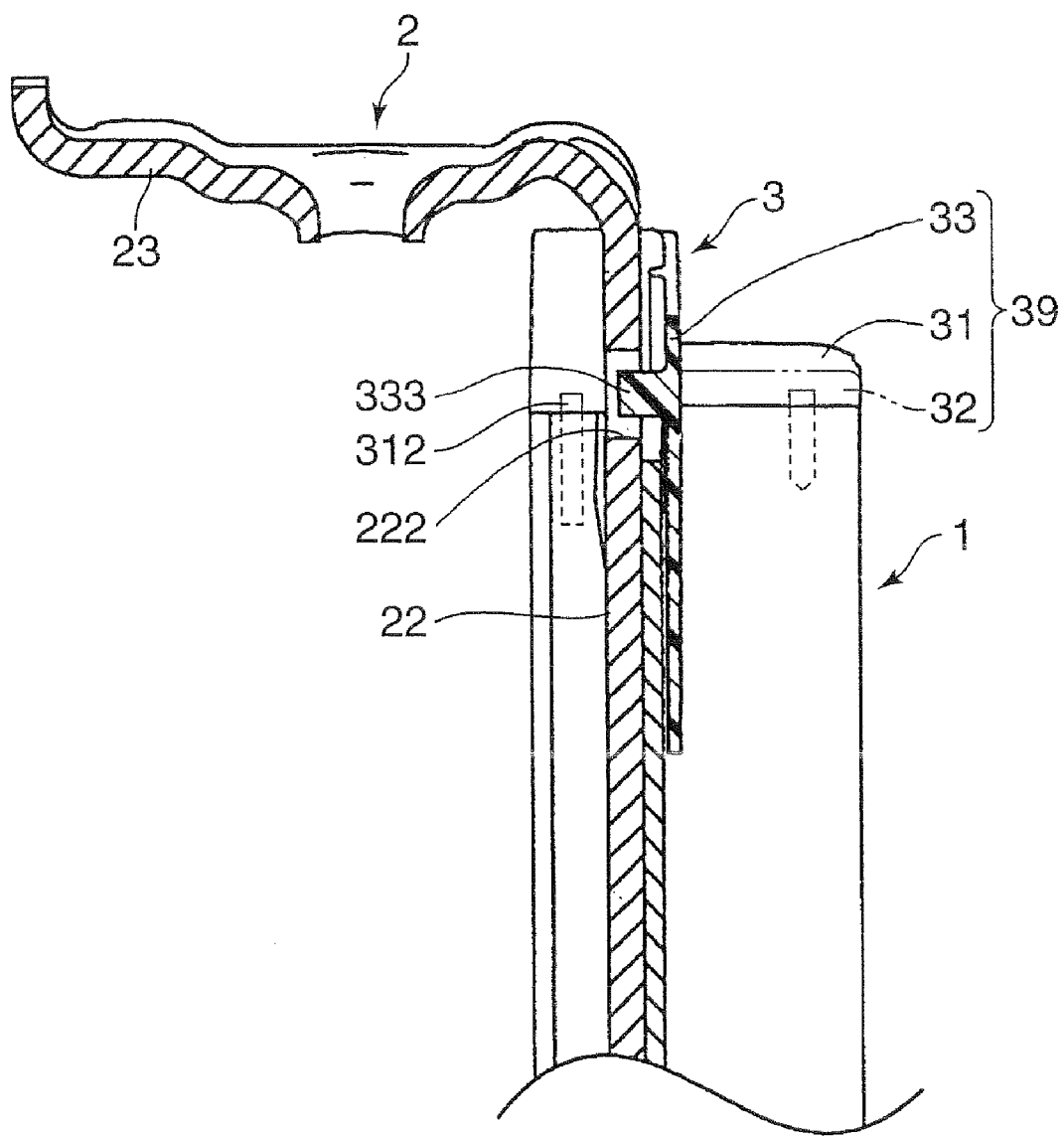
FIG. 3 is a vertical sectional view showing how to attach a protector according to the first embodiment.

As shown in FIGS. 2 and 3, the center channel 1 is a press-formed sheet metal having an H-shaped upper end surface. As a single unit, the center channel 1 includes a pair of branch portions 11 and 12 and a middle vertical-wall portion 15 disposed between the branch portions 11 and 12 so as to connect the both branch portions 11 and 12 therewith.

Each branch portion 11 and 12 extends vertically, and the width directions thereof are along the front and rear directions of the vehicle sash door D. The middle vertical-wall portion 15 extends vertically, and the width directions thereof are along the thickness directions of the vehicle sash door D.

The middle vertical-wall portion 15 is provided at the upper end with an L-shaped bracket 2 connecting the center channel 1 and the lateral sash part of the main sash 5. The bracket 2 is welded thereto and integrally includes a vertical portion 22 protruding upward from the upper end of the middle vertical-wall portion 15 and a lateral portion 23 bending perpendicularly from the upper end of the vertical portion 22. The vertical portion 22 is fixed at a lower part thereof to the middle vertical-wall portion 15 by means such as spot welding. The vertical portion 22 of the bracket 2 is formed therein an engagement hole 222 (described later) for attaching the protector 3.

The protector 3 is made of a specified thermoplastic synthetic resin (plastic) and includes a body 39 having an H-shaped bottom surface as a main body. The body 39 basically includes a pair of branch covering portions 31 and 32 in parallel which covers each branch portion 11 and 12 of the center channel 1 from above, and a middle covering portion 33 connecting midways, in the longitudinal directions thereof, of the branch covering portions 31 and 32 and covering the middle vertical-wall portion 15 of the center channel 1 from above.

Each branch covering portion 31 and 32 is provided near each end in the longitudinal directions with a leg portion 311, 312, 321, and 322, respectively, which hangs toward the corresponding branch portion 11 and 12 and is, respectively, inserted into an attachment portion 111, 112, 121, and 122 formed near each end of the branch portion 11 and 12. On the other hand, the middle covering portion 33 is provided at a substantially middle part with a projection 333 as an engaging portion which is inserted into the engagement hole 222 in the vertical portion 22 of the L-shaped bracket 2. In this embodiment, these projection 333 and vertical portion 22 (provided therein the engagement hole 222) constitute a fastening mechanism which mechanically fastens the protector 3 to the center channel 1 by engaging therewith in directions (the front and rear directions in each figure) intersecting the vertical directions in an assemble state of the protector 3 to the center channel 1.

The configuration enables an easy and simple attachment of the protector 3 to the upper end of the center channel 1. Specifically, the protector 3 is attached (mounted) to the upper end of the center channel 1 by bringing the protector 3 from above closer to the upper end of the center channel 1, inserting the four leg portions 311, 312, 321 and 322 of the protector 3 into the attachment portions 111, 112, 121 and 122, respectively, and inserting the projection 333 into the engagement hole 222. In the thus attached protector 3, each leg portion 311, 312, 321, and 322 and the projection 333 fasten the protector 3 to the center channel 1 mechanically in the two directions, thereby firmly preventing the protector 3 from falling off and thus effectively protecting the part around the upper end of the center channel 1 (designated by A of FIG. 1).

Now, a second embodiment of the present invention will be described with reference to FIGS. 4 and 5.

The second embodiment is basically the same as the above embodiment in fixing the protector 3 to the upper end of the center channel 1 having an H-shaped cross section. It is noted that FIG. 4 shows only one branch portion 11 attached to the outer-plate surface of the vehicle sash door D in FIG. 1. Specifically, the protector 3 includes a branch covering portion 35 which is shaped in a lateral bar along the longitudinal directions of the main sash 5. The branch covering portion 35 in lateral bar shape covers the upper end of the branch portion 11 of the center channel 1 on the side of the door outer-plate surface. The branch covering portion 35 is provided near each end in the longitudinal directions with a downward leg portion 351 and a hook portion 352 as an engaging portion. These portions are integrally made of a specified thermoplastic synthetic resin.

A bracket 2 provided to the center channel 1 is formed therein an engagement hollow portion 225 shaped like a notch corresponding to the hook portion 352 of the branch covering portion 35. In the embodiment of FIGS. 4 and 5, the engagement hollow portion 225 is an example of an engagement hollow portion formed in a vertical portion 22 as an engaged portion to be engaged with the hook portion 352. In the second embodiment, the vertical portion 22 (provided therein the engagement hollow portion 225) and the hook portion 352 constitute a fastening mechanism which mechanically fastens the protector 3 to the center channel 1 by engaging therewith in directions (the thickness directions of the vehicle sash door D in each figure) intersecting the vertical directions in an assemble state of the protector 3 to the center channel 1.

Figure 4:
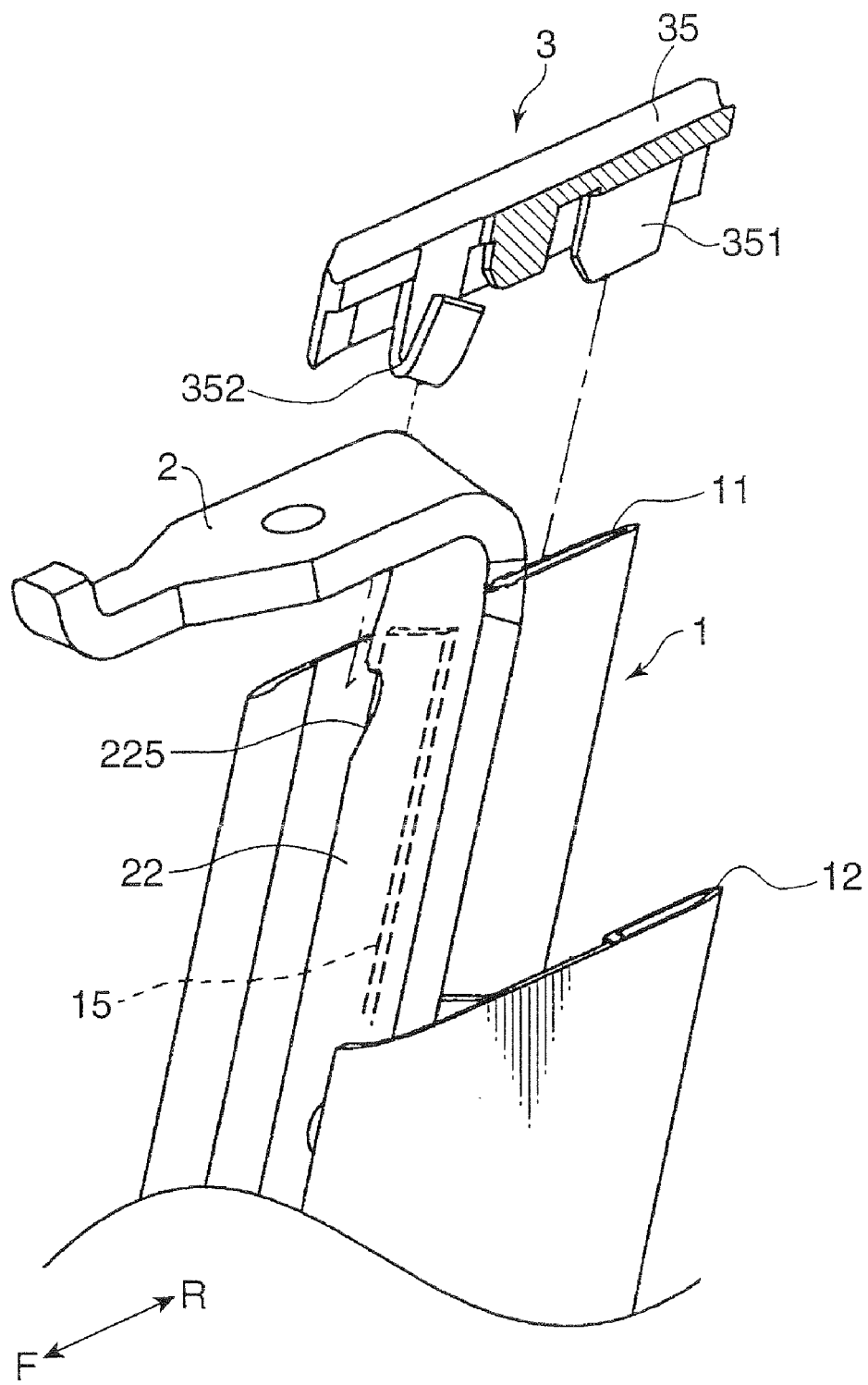
FIG. 4 is a perspective developed view partially showing a configuration around a protector attachment part according to a second embodiment of the present invention.
Figure 5A:
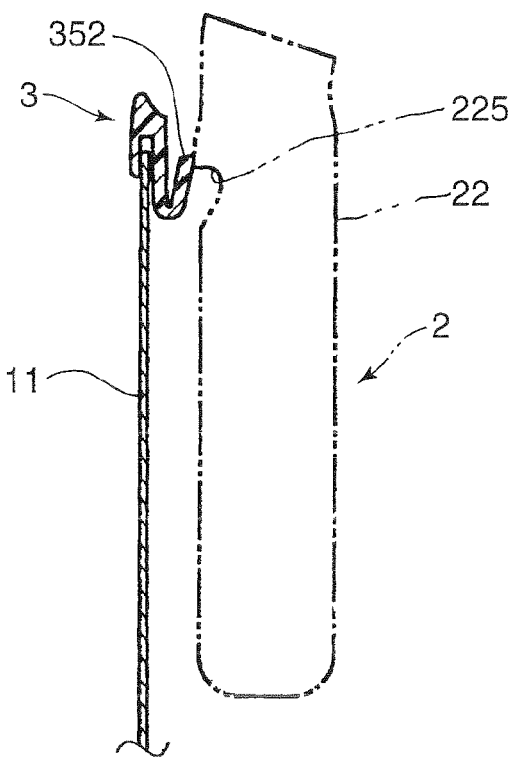
FIGS. 5A and 5B are vertical sectional views showing how to attach a protector according to the second embodiment.
Figure 5B:
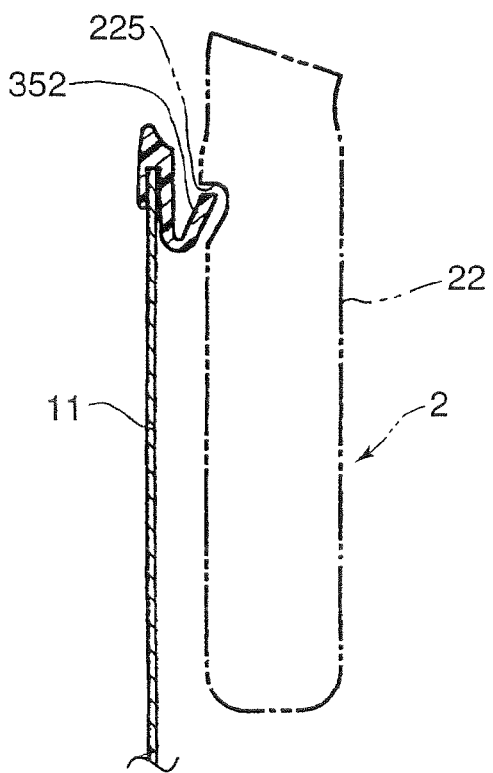
Figure 6:
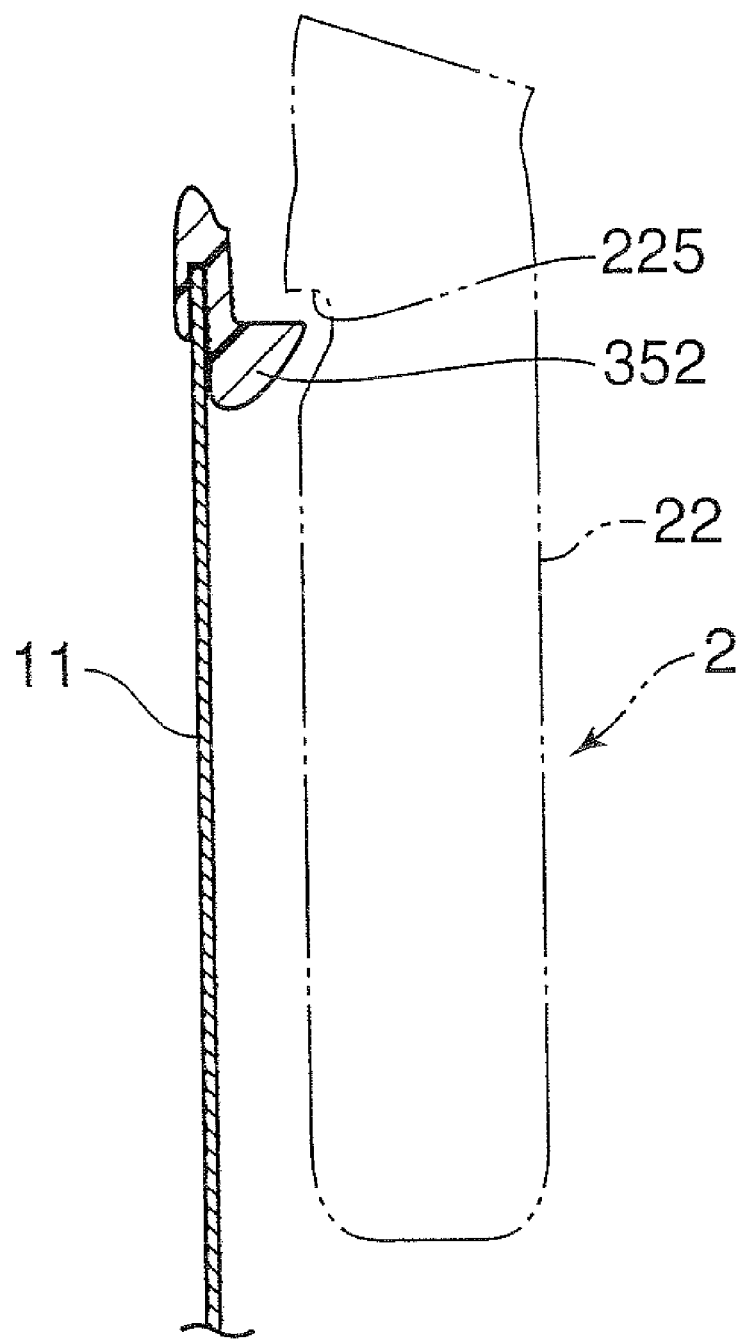
FIG. 6 is a vertical sectional view showing a variation of the protector according to the second embodiment.

In the configuration of FIG. 4, the protector 3 is pressed from above against the center channel 1 to fit the leg portion 351 into an opening of the branch portion 11. As shown in FIG. 5A, the hook portion 352 on the other-end side of the protector 3 is once deflected in the pressing process. Then, as shown in FIG. 5B, the hook portion 352 returned to free state to thereby engaging with the engagement hollow portion 225. As a result, the protector 3 is attached to the upper end of the center channel 1, in other words, the branch covering portion 35 of the protector 3 covers the upper end of the center channel 1, thereby protecting the branch portion 11 or the like. Likewise in the embodiment of FIGS. 4 and 5A and 5B, the hook portion 352 is engaged with the engagement hollow portion 225 in directions intersecting the vertical directions to thereby anchor the protector 3 mechanically to the center channel 1. The specific aspect of the hook portion 352 is not limited to the one elastically deformed in the shape of such a hook, and for example, may be a solid hook-shaped protrusion shown in FIG. 6.

According to the embodiments described above, the body of the protector 3 having an H-shaped plane is attached to the center channel 1 so as to cover the upper end thereof, thereby protecting the upper end of the center channel 1. Besides, the fastening mechanism (222, 333, 225, 352) fastens the protector on the attached protector 3 mechanically to the center channel 1. Without any adhesion means, this vehicle sash door D in which the protector 3 protects the center channel 1 can be kept securely anchored over a relatively long period of time, though such adhesion means is not precluded from the present invention. Therefore, even if the vehicle sash door D is in a semi-fabricated product, transportations of such the product would be conducted without any damage of the upper-end part of the center channel 1, provided that the product has the protector 2. In addition, omission of adhesion means would be preferable because it makes free from disadvantages, such as an adhesive stains peripheral members caused by leaking out or the like, an adhesive deteriorates which would cause the protector to be fallen off or detached.

In summary, one aspect of the present invention is a vehicle sash door which includes a main sash, a center channel partitioning a window frame together with the main sash and guiding ascents and descents of a window glass arranged in a partition of the window frame, and a protector. The center channel integrally including: a pair of branch portions facing each other in parallel; a middle vertical-wall portion disposed between the branch portions so as to connect the both branch portions therewith, in such a way that the center channel forms an upper-end surface having an H-shape. A body of the protector integrally including: a pair of branch covering portions corresponding to the branch portions; and a middle covering portion disposed between the branch covering portions so as to connect the both branch covering portions therewith, in such a away that the body has an H-shaped bottom surface which is compatible to cover the upper-end surface of the center channel. The center channel and the protector constitute a fastening mechanism which mechanically fastens the protector to the center channel by engaging therewith in directions intersecting the vertical directions when mounting the protector to the center channel.

In a preferred aspect, the fastening mechanism includes an engaged portion arranged on the center channel side and a protrusion which protrudes from a midway part of the middle covering portion in the longitudinal directions thereof and inserted into an engagement hole formed in the engaged portion.

In another preferred aspect, the fastening mechanism includes an engaged portion arranged on the center channel side and a hook portion which extends from either one of the branch covering portions and engages with an engagement hollow portion formed in the engaged portion.

In still another preferred aspect, the protector further includes a leg portion which protrudes from the bottom of the branch covering portion and is inserted into a hollow portion formed in the upper end of the center channel in an attaching state of the body to the upper end of the center channel. According to this aspect, the leg portion suppresses a displacement in front and rear or right and left directions in collaboration with the fastening mechanism, thereby sustaining the protector in firm structure.

In still another preferred aspect, the leg portion is a pin hanging from a lower surface of the branch covering portion. As shown in FIG. 2, the pin may be inserted into an attachment portion formed in the branch portion of the center channel, or as shown in FIG. 4, the pin may be inserted into a space formed between the middle vertical-wall portion of the center channel and a bracket fixed to the middle vertical-wall portion.

Another aspect of the present invention is a center-channel protector for a vehicle sash door which is arranged between a main sash and a center channel having an H-shaped upper-end surface so as to cover the upper end of the center channel. A body of the protector forms an H-shaped bottom surface which is compatible to cover the upper-end surface of the center channel and integrally includes a pair of branch covering portions corresponding to a pair of branch portions constituting the center channel, a middle covering portion disposed between the branch covering portions so as to connect the both branch covering portions therewith, and an engaging portion engages with an engaged portion which is provided with a center channel side in a direction intersecting a vertical direction. The engaging portion constitutes a fastening mechanism by which the protector is mechanically fastened to the center channel in collaboration with the engaged portion.

In a preferred protector, the engaging portion is a protrusion jutting out from a midway part of the middle covering portion in the longitudinal directions thereof and inserting into an engagement hole formed in the engaged portion.

In another preferred protector, the engaging portion includes a hook portion extending from either one of the branch covering portions and engaging with an engagement hollow portion formed in the engaged portion.

In still another preferred protector is further provided with a leg portion which protrudes from the bottom of the branch covering portion and is inserted into a hollow portion formed in the upper end of the center channel in an attaching state of the body to the upper end of the center channel.

In still another preferred protector, the leg portion is a pin hanging from a lower surface of the branch covering portion. As shown in FIG. 2, the pin may be inserted into an attachment portion formed in the branch portion of the center channel, or as shown in FIG. 4, the pin may be inserted into a space formed between the middle vertical-wall portion of the center channel and a bracket fixed to the middle vertical-wall portion.

Still another aspect of the present invention is a center channel for a vehicle sash door which includes an upper-end junction portion having an H-shaped upper-end surface and is covered with a protector having an H-shaped plane which is so compatible as to cover the upper-end surface of the center channel, including: a pair of branch portions facing each other in parallel; a middle vertical-wall portion disposed between the branch portions so as to connect the both branch portions therewith; and an engaged portion to which is engaged with an engaging portion formed in the protector in an attaching state of the protector so as to constitute a fastening mechanism by which the protector is fastened on the center channel in collaboration with the engaging portion.

In a preferred center channel, the engaged portion is formed therein an engagement hole penetrated by a protrusion as the engaging portion protruding from a midway part in the longitudinal directions of a middle covering portion of the protector.

In a preferred center channel, the engaged portion is formed therein an engagement hollow portion engaging with a hook portion as the engaging portion extending from either of branch covering portions of the protector.

In a preferred center channel, a bracket fixed to the middle vertical-wall portion is further provided; and the engaged portion is formed on the bracket.

In a preferred center channel, the branch portion includes a leg holder for inserting a leg portion formed in a lower part of the protector in an attaching state of the protector to the upper end of the center channel.

In a preferred center channel, a bracket fixed to the middle vertical-wall portion is further provided; and the leg holder is a space formed between the middle vertical-wall portion and the bracket.

In any above aspect, an engagement hole or an engagement hollow portion may be formed directly in the center channel. Alternatively, it will be appreciated that the protector is provided with a member including an engagement hole or an engagement hollow portion as the engaging portion and the center channel is provided with a protrusion or a hook portion as the engaged portion.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial No. 2007-317866, filed in Japan Patent Office on Dec. 10, 2007, the contents of which are hereby incorporated by reference.

What is claimed is:

1. A center-channel protector for a vehicle sash door which is arranged between a main sash and a center channel having an H-shaped upper-end surface in the vehicle sash door so as to cover the upper end of the center channel, a body thereof forming an H-shaped bottom surface which is compatible to cover the upper-end surface of the center channel integrally comprising:

a pair of branch covering portions corresponding to a pair of branch portions constituting the center channel;

a middle covering portion disposed between the branch covering portions so as to connect the both branch covering portions therewith; and an engaging portion engages with an engaged portion which is provided with a center channel side in a direction intersecting a vertical direction, the engaging portion constitutes a fastening mechanism by which the protector is mechanically fastened to the center channel in collaboration with the engaged portion, wherein the engaging portion is engaged with the engaged portion formed on a vertical portion of a bracket fixed to the middle covering portion so that the engaged portion protrudes beyond the upper end of the middle vertical wall portion.

2. The center-channel protector for a vehicle sash door according to claim 1, wherein the engaging portion is a protrusion jutting out from a midway part of the middle covering portion in the longitudinal directions thereof and inserting into an engagement hole formed in the engaged portion.

3. The center-channel protector for a vehicle sash door according to claim 1, further comprising a leg portion which protrudes from the bottom of the branch covering portion and is inserted into a hollow portion formed in the upper end of the center channel in an attaching state of the body to the upper end of the center channel.

4. The center-channel protector for a vehicle sash door according to claim 3, wherein the leg portion is a pin hanging from a lower surface of the branch covering portion.

5. The center-channel protector for a vehicle sash door according to claim 4, wherein the pin is inserted into an attachment portion formed in the branch portion of the center channel.

6. The center-channel protector for a vehicle sash door according to claim 4, wherein the pin is inserted into a space formed between the middle vertical-wall portion of the center channel and a bracket fixed to the middle vertical-wall portion.

7. A center channel for a vehicle sash door which includes an upper-end junction portion having an H-shaped upper-end surface and is covered with a protector having an H-shaped plane which is so compatible as to cover the upper-end surface of the center channel, comprising:

a pair of branch portions facing each other in parallel;

a middle vertical-wall portion disposed between the branch portions so as to connect the both branch portions therewith; and an engaged portion-to which is engaged with an engaging portion formed in the protector in an attaching state of the protector so as to constitute a fastening mechanism by which the protector is fastened on the center channel in collaboration with the engaging portion engaged portion protrudes beyond the upper end vertical portion protrudes up from the upper end.

8. The center channel for a vehicle sash door according to claim 7, wherein the engaged portion is formed therein an engagement hole penetrated by a protrusion as the engaging portion protruding from a midway part in the longitudinal directions of a middle covering portion of the protector.

9. The center channel for a vehicle sash door according to claim 7, wherein the branch portion includes a hollow shaped leg holder for inserting a leg portion formed in a lower part of the protector in an attaching state of the protector to the upper end of the center channel.

10. The center channel for a vehicle sash door according to 9, further comprising a bracket fixed to the middle vertical-wall portion and forms a space between the middle vertical-wall portion and the bracket as the leg holder.

\* \* \* \* \*